(12) United States Patent
Kim et al.

(10) Patent No.: US 11,336,885 B2
(45) Date of Patent: May 17, 2022

(54) 3D DISPLAY APPARATUS HAVING LENTICULAR LENSES

(71) Applicant: LG Display Co., Ltd., Seoul (KR)

(72) Inventors: Young-Min Kim, Goyang-si (KR); Hoon Kang, Goyang-si (KR); Ju-Seong Park, Gimpo-si (KR); Myung-Soo Park, Gimpo-si (KR); Dong-Yeon Kim, Seoul (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 17/129,179

(22) Filed: Dec. 21, 2020

(65) Prior Publication Data

US 2021/0203913 A1 Jul. 1, 2021

(30) Foreign Application Priority Data

Dec. 30, 2019 (KR) .................. 10-2019-0178469

(51) Int. Cl.
*H04N 13/305* (2018.01)
*H04N 13/349* (2018.01)

(52) U.S. Cl.
CPC ......... *H04N 13/305* (2018.05); *H04N 13/349* (2018.05)

(58) Field of Classification Search
USPC ........................................................ 348/51
See application file for complete search history.

(56) References Cited

U.S. PATENT DOCUMENTS

| | | | |
|---|---|---|---|
| 5,625,489 A * | 4/1997 | Glenn ................... | G03B 21/602 264/1.34 |
| 9,633,593 B2 * | 4/2017 | Lim ..................... | G09G 3/2003 |
| 2005/0130045 A1 * | 6/2005 | Ozawa ................ | G03F 7/70466 430/5 |
| 2007/0146271 A1 * | 6/2007 | Park ..................... | G02F 1/1335 345/89 |
| 2012/0038867 A1 * | 2/2012 | Kwon ................ | G02F 1/133512 349/110 |
| 2012/0229718 A1 * | 9/2012 | Huang .............. | G02F 1/133526 349/15 |
| 2013/0128354 A1 * | 5/2013 | Whangbo .............. | G02B 30/27 359/463 |
| 2014/0049983 A1 * | 2/2014 | Nichol ................. | G02B 6/0028 362/610 |
| 2014/0063211 A1 * | 3/2014 | Fang .................... | H04N 13/332 348/54 |
| 2016/0116834 A1 * | 4/2016 | Candry ................ | G03B 21/604 359/449 |
| 2017/0045782 A1 * | 2/2017 | Cho .................. | G02F 1/133514 |
| 2017/0154942 A1 * | 6/2017 | Kim ........................ | H01L 51/56 |
| 2018/0188606 A1 * | 7/2018 | Lee .................... | G02F 1/133609 |
| 2021/0013455 A1 * | 1/2021 | Bae ..................... | H01L 51/5284 |

* cited by examiner

*Primary Examiner* — Behrooz M Senfi
(74) *Attorney, Agent, or Firm* — Seed IP Law Group LLP

(57) ABSTRACT

A 3D display apparatus including lenticular lenses is provided. The lenticular lenses may be disposed between a display panel and a viewing angle control film. A direction in which the lenticular lenses extend may be inclined with a direction in which pixel regions of the display panel are arranged. The display panel may include light-blocking patterns overlapping with a boundary of the lenticular lenses. Thus, in the 3D display apparatus, the quality of the image provided to the user may be improved.

13 Claims, 5 Drawing Sheets

3D DISPLAY APPARATUS HAVING LENTICULAR LENSES

CROSS-REFERENCE TO RELATED APPLICATION(S)

This application claims the priority benefit of Korean Patent Application No. 10-2019-0178469, filed Dec. 30, 2019, which is hereby incorporated by reference as if fully set forth herein.

BACKGROUND

Technical Field

The present disclosure relates to a 3D display apparatus in which lenticular lenses are disposed on a display panel.

Description of the Related Art

A display apparatus may provide a 2D image and/or a 3D image to a user. For example, the display apparatus may be a 3D display apparatus in which lenticular lenses are disposed on a display panel. The display panel may realize the image provided to the user. For example, the display panel may include a plurality of pixel regions.

Each of the pixel regions may display a specific color. For example, a light-emitting device may be disposed in each pixel region. The light-emitting device may emit light displaying the specific color. For example, the light-emitting device may include a light-emitting layer between a first electrode and a second electrode.

The 3D display apparatus may realize the 3D image provided to the user by superimposing light emitted from each pixel region of the display panel in a set region using the lenticular lenses. The 3D display apparatus may further include a viewing angle control film on the lenticular lenses. The viewing angle control film may block light emitting in an outward direction of the set region by the lenticular lenses to prevent the generation of a repeated image at the outside of the set region.

BRIEF SUMMARY

As discussed above, the viewing angle control film may block light emitting in an outward direction of the set region by the lenticular lenses to prevent the generation of a repeated image at the outside of the set region. However, when the display panel is bent at a certain curvature, the 3D display apparatus may be difficult to prevent the generation of the repeated image using only the viewing angle control film.

Accordingly, the present disclosure is directed to a display apparatus that substantially obviates one or more problems due to limitations and disadvantages of the related art.

An object of the present disclosure is to provide a 3D display apparatus capable of easily preventing the repeated image, when the display panel is curved.

Another object of the present disclosure is to provide a 3D display apparatus capable of minimizing or reducing luminance degradation by the viewing angle control film.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a 3D display apparatus comprising a display panel. The display panel includes pixel regions and light-blocking patterns. The pixel regions are disposed side by side in a first direction and a second direction perpendicular to the first direction. Lenticular lenses are disposed on the display panel. A viewing angle control film is disposed on the lenticular lenses. Each of the lenticular lenses extends in an inclined direction based on the first direction. The light-blocking patterns overlap a boundary of the lenticular lenses.

Each of the light-blocking patterns may extend in the same direction as the lenticular lenses.

A lens adhesive layer may be disposed between the display panel and the lenticular lenses.

An optical element may be disposed between the display panel and the lens adhesive layer. The lens adhesive layer may be in contact with the optical element and the lenticular lenses.

The viewing angle control film may include transparent elements and viewing angle control patterns. The viewing angle control patterns may be disposed between the transparent elements. Each of the viewing angle control patterns may extend the same direction as the lenticular lenses.

The viewing angle control patterns may overlap the light-blocking patterns.

An air-gap may be disposed between the lenticular lenses and the viewing angle control film. The air-gap may overlap the light-blocking patterns.

An edge of the display panel and an edge of the viewing angel control film may be in contact with a fixing element.

A black matrix may be disposed between the pixel regions.

The black matrix may include the same material as the light-blocking patterns.

The black matrix may be disposed on a layer different from the light-blocking patterns.

A planarizing layer may be disposed between the black matrix and the light-blocking patterns.

The display panel and the viewing angle control film may have a certain curvature in the second direction.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
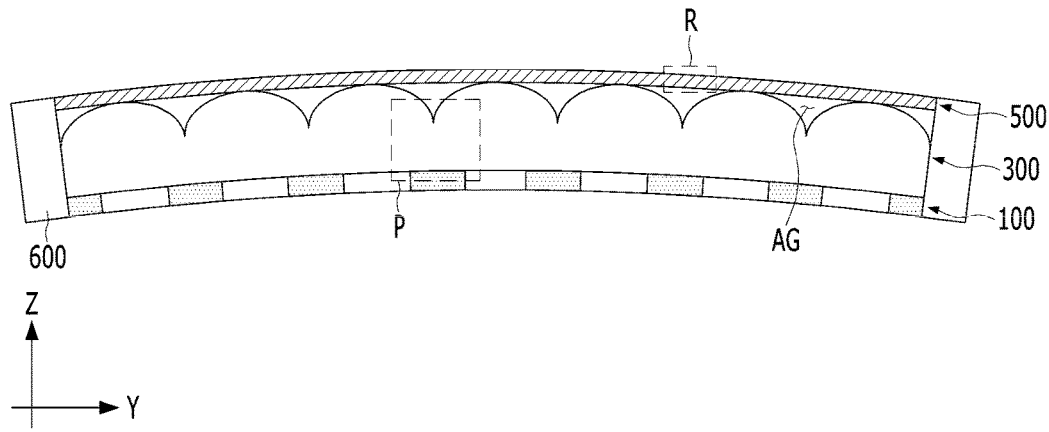
FIG. 1 is a view schematically showing a 3D display apparatus according to various embodiments of the present disclosure.

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical sprit of the present disclosure to be satisfactorily transferred to those skilled in the art, and thus the present disclosure may be embodied in other forms and is not limited to the embodiments described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Figure 2A:
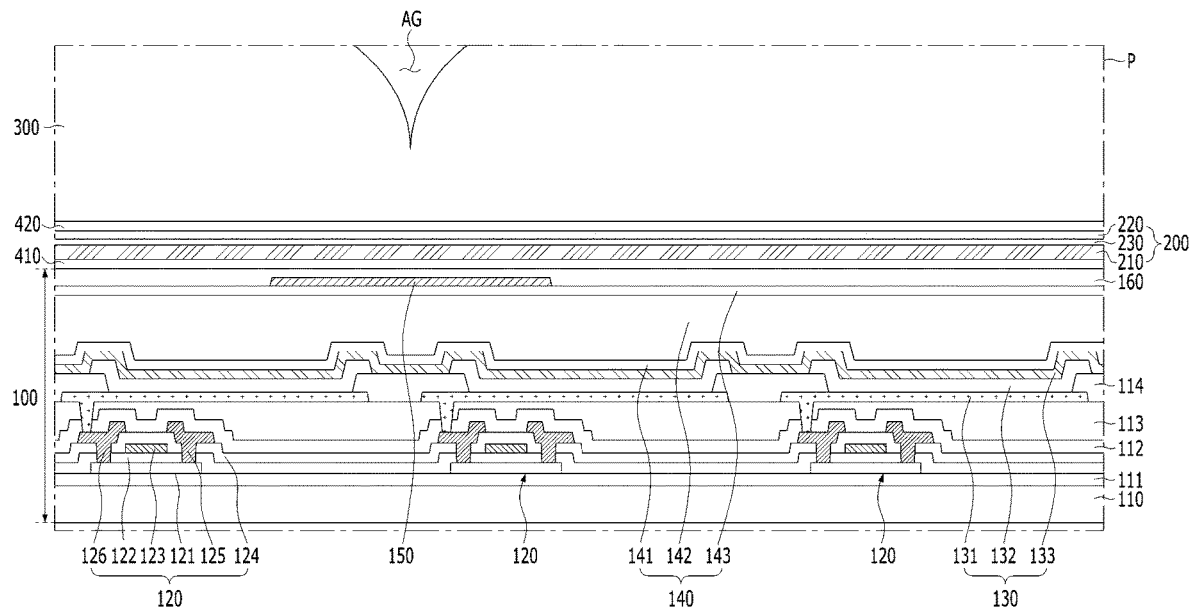
FIG. 2A is an enlarged view of P region in FIG. 1 according to various embodiments of the present disclosure.
Figure 2B:
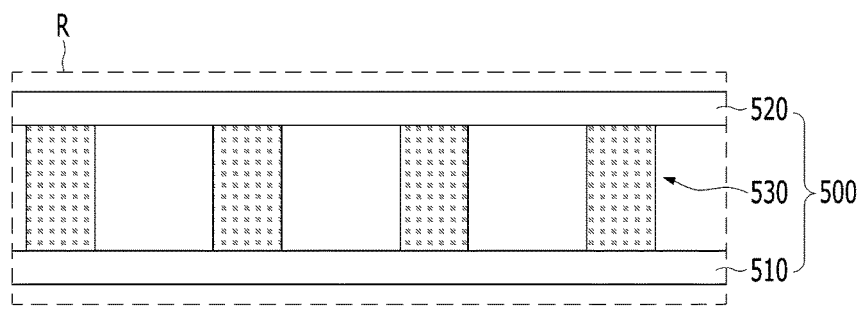
FIG. 2B is an enlarged view of R region in FIG. 1 according to various embodiments of the present disclosure.
Figure 3:
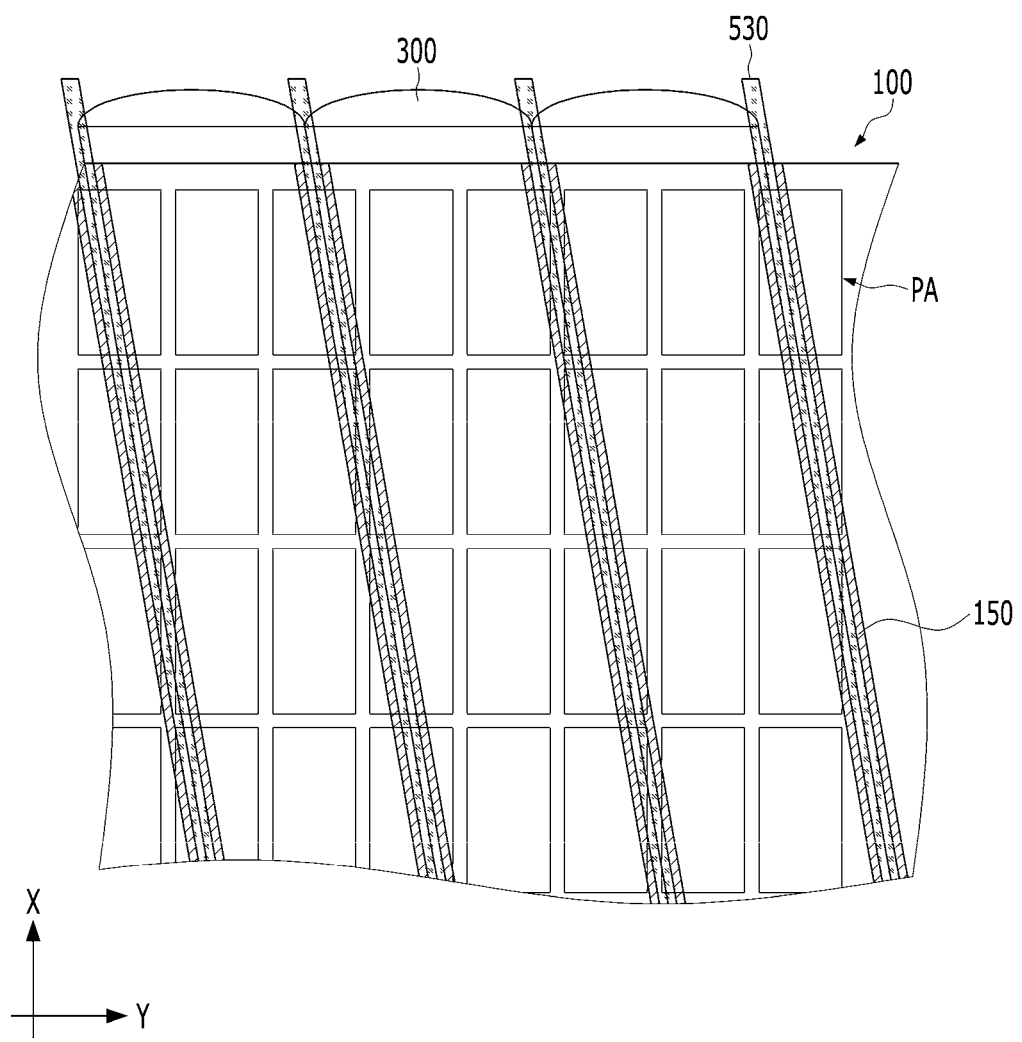
FIG. 3 is a view partially showing a plane of the 3D display apparatus according to various embodiments of the present disclosure.

FIG. 1 is a view schematically showing a 3D display apparatus according to various embodiments of the present disclosure. FIG. 2A is an enlarged view of P region in FIG. 1. FIG. 2B is an enlarged view of R region in FIG. 1. FIG. 3 is a view partially showing a plane of the 3D display apparatus according to various embodiment of the present disclosure.

Referring to FIGS. 1 to 3, the 3D display apparatus according to various embodiment of the present disclosure may include a display panel 100. The display panel 100 may realize an image provided to a user. For example, the display panel 100 may include a plurality of pixel regions PA. The pixel regions PA may be disposed side by side in a first direction X and a second direction Y perpendicular to the first direction X.

Each of the pixel regions PA may display a specific color. For example, each of the pixel regions PA may include a light-emitting device 130. The light-emitting device 130 may emit light displaying the specific color. For example, the light-emitting device 130 may include a first electrode 131, a light-emitting layer 132 and a second electrode 133, which are sequentially stacked on a device substrate 110. The device substrate 110 may include an insulating material. For example, the device substrate 110 may include glass or plastic.

The first electrode 131 may include a conductive material. The first electrode 131 may include a material having high reflectance. For example, the first electrode 131 may include a metal, such as aluminum (Al) and silver (Ag). The first electrode 131 may have a multi-layer structure. For example, the first electrode 131 may have a structure in which the reflective electrode formed of metal is disposed between transparent electrodes formed of a transparent conductive material, such as ITO and IZO.

The light-emitting layer 132 may generate light having luminance corresponding to a voltage difference between the first electrode 131 and the second electrode 133. For example, the light-emitting layer 132 may include an emission material layer (EML) having an emission material. The emission material may include an organic material, an inorganic material or a hybrid material. For example, the display panel 100 of the 3D display apparatus according to various embodiments of the present disclosure may be an organic light-emitting display apparatus having the light-emitting layer 132 formed of an organic material.

The second electrode 133 may include a conductive material. The second electrode 133 may include a material different from the first electrode 131. For example, the second electrode 133 may be a transparent electrode formed of a transparent conductive material, such as ITO and IZO. Thus, in the 3D display apparatus according to various embodiments of the present disclosure, the light generated from the light-emitting layer 132 in each pixel region PA of the display panel 100 may be emitted to outside through the second electrode 133.

The light-emitting device 130 may further include an emitting function layer between the first electrode 131 and the light-emitting layer 132 and/or between the light-emitting layer 132 and the second electrode 133. The emitting function layer may include at least one of a hole injection layer (HIL), a hole transmitting layer (HTL), an electron transmitting layer (ETL) and an electron injection layer (EIL). Thus, in the display panel 100 of the 3D display apparatus according to various embodiments of the present disclosure, the efficiency of the light-emitting device 130 may be improved.

Each of the pixel regions PA may include a driving circuit electrically connected to the light-emitting device 130 disposed in the corresponding pixel region PA. The driving circuit may supply a driving current corresponding to a data signal according to a scan signal to the light-emitting device 130. For example, the driving circuit may include a thin film transistor 120. The thin film transistor 120 may include a semiconductor pattern 121, a gate insulating layer 122, a gate electrode 123, an interlayer insulating layer 124, a source electrode 125 and a drain electrode 126.

The semiconductor pattern 121 may include a semiconductor material. For example, the semiconductor pattern 121 may include silicon. The semiconductor pattern 121 may be an oxide semiconductor. For example, the semiconductor pattern 121 may include a metal oxide, such as IGZO. The semiconductor pattern 121 may include a source region, a drain region and a channel region. The channel region may be disposed between the source region and the drain region. The source region and the drain region may have a resistance lower than the channel region.

The gate insulating layer 122 may be disposed on the semiconductor pattern 122. The gate insulating layer 122 may extend beyond the semiconductor pattern 121. For example, a side surface of the semiconductor pattern 121 may be covered by the gate insulating layer 122. The gate insulating layer 122 may include an insulating material. For example, the gate insulating layer 122 may include silicon oxide (SiO) or silicon nitride (SiN). The gate insulating layer 122 may include a high-K material. For example, the gate insulating layer 122 may include titanium oxide (TiO). The gate insulating layer 122 may have a multi-layer structure.

The gate electrode 123 may be disposed on the gate insulating layer 122. The gate electrode 123 may overlap the channel region of the semiconductor pattern 121. For example, the gate electrode 123 may be insulated from the semiconductor pattern 121 by the gate insulating layer 122. The gate electrode 123 may include a conductive material. For example, the gate electrode 123 may include a metal, such as aluminum (Al), chrome (Cr), copper (Cu), Titanium (Ti), molybdenum (Mo) and tungsten (W).

The interlayer insulating layer 124 may be disposed on the gate electrode 123. The interlayer insulating layer 124 may extend beyond the semiconductor pattern 121. For example, a side surface of the gate electrode 123 may be covered by the interlayer insulating layer 124. The interlayer insulating layer 124 may include an insulating material. For example, the interlayer insulating layer 124 may include silicon oxide (SiO).

The source electrode 125 may be disposed on the interlayer insulating layer 124. The source electrode 125 may be electrically connected to the source region of the semiconductor pattern 121. For example, the gate insulating layer 122 and the interlayer insulating layer 124 may include a source contact hole partially exposing the source region of the semiconductor pattern 121. The source electrode 125 may be in direct contact with the source region of the semiconductor pattern 121 at the inside of the source contact hole. The source electrode 125 may include a conductive material. For example, the source electrode 125 may include a metal, such as aluminum (Al), chrome (Cr), copper (Cu), Titanium (Ti), molybdenum (Mo) and tungsten (W). The source electrode 125 may include a material different from the gate electrode 123.

The drain electrode 126 may be disposed on the interlayer insulating layer 124. The drain electrode 126 may be electrically connected to the drain region of the semiconductor pattern 121. The drain electrode 126 may be spaced away from the source electrode 125. For example, the gate insulating layer 122 and the interlayer insulating layer 124 may include a drain contact hole partially exposing the drain region of the semiconductor pattern 121. The drain electrode 126 may be in direct contact with the drain region of the semiconductor pattern 121 at the inside of the drain contact hole. The drain electrode 126 may include a conductive material. For example, the drain electrode 126 may include a metal, such as aluminum (Al), chrome (Cr), copper (Cu), Titanium (Ti), molybdenum (Mo) and tungsten (W). The drain electrode 126 may include the same material as the source electrode 125. The drain electrode 126 may include a material different from the gate electrode 123.

The driving circuit may be disposed between the device substrate 110 and the first electrode 131 of the corresponding light-emitting device 130. For example, the semiconductor pattern 121 of the thin film transistor 120 may be disposed close to the device substrate 110. Thus, in the display panel 100 of the 3D display apparatus according to various embodiments of the present disclosure, the light emitted from the light-emitting device 130 may be not blocked by the driving circuit.

A buffer layer 111 may be disposed between the device substrate 110 and the driving circuits. The buffer layer 111 may prevent pollution due to the device substrate 110 in a process of forming the driving circuits. For example, the buffer layer 111 may be disposed between the device substrate 110 and the semiconductor pattern 121 of each driving circuit. The buffer layer 111 may extend beyond the semiconductor patterns 121. For example, an entire surface of the device substrate 110 toward the driving circuits may be covered by the buffer layer 111. The buffer layer 111 may include an insulating material. For example, the buffer layer 111 may include silicon oxide (SiO) and/or silicon nitride (SiN). The buffer layer 111 may have a multi-layer structure.

A lower passivation layer 112 may be disposed between the driving circuits and the light-emitting devices 130. The lower passivation layer 112 may prevent the damage of the driving circuits due to the external impact and moisture. For example, the lower passivation layer 112 may completely cover an entire surface of the driving circuits toward the light-emitting devices 130. The lower passivation layer 112 may extend beyond the source electrode 125 and the drain electrode 126 of each driving circuit. The lower passivation layer 112 may include an insulating material. For example, the lower passivation layer 112 may include silicon oxide (SiO) or silicon nitride (SiN).

An over-coat layer 113 may be disposed between the lower passivation layer 112 and the light-emitting devices 130. The over-coat layer 113 may remove a thickness difference due to the driving circuits. For example, a surface of the over-coat layer 113 opposite to the device substrate 110 may be a flat surface. The over-coat layer 113 may extend along the lower passivation layer 112. The over-coat layer 113 may include an insulating material. The over-coat layer 113 may include a material different from the lower passivation layer 112. For example, the over-coat layer 113 may include an organic material.

The lower passivation layer 112 and the over-coat layer 113 may include electrode contact holes exposing a portion of each thin film transistor 120. Each of the light-emitting devices 130 may be electrically connected to the corresponding thin film transistor 120 through one of the electrode contact holes. For example, the first electrode 131 of each light-emitting device 130 may be in direct contact with the drain electrode 126 of the corresponding thin film transistor 120 at the inside of the corresponding electrode contact hole.

An encapsulating element 140 may be disposed on the light-emitting devices 130. The second electrode 133 of each light-emitting device 130 may be disposed close to the encapsulating element 140. For example, the light-emitting devices 130 may be disposed between the device substrate 110 and the encapsulating element 140. The encapsulating element 140 may prevent the damage of the light-emitting devices 130 due to the external impact and moisture. The encapsulating element 140 may extend beyond each light-emitting device 130. For example, the light-emitting devices 130 may be covered by the encapsulating element 140.

The encapsulating element 140 may have a multi-layer structure. For example, the encapsulating element 140 may include a first encapsulating layer 141, a second encapsulating layer 142 and a third encapsulating layer 143, which are sequentially stacked on the light-emitting devices 130. The first encapsulating layer 141, the second encapsulating layer 142 and the third encapsulating layer 143 may include an insulating material. The second encapsulating layer 142 may include a material different from the first encapsulating layer 141 and the third encapsulating layer 143. For example, the first encapsulating layer 141 and the third encapsulating layer 143 may include an inorganic material, and the second encapsulating layer 142 may include an organic material. Thus, in the display panel 100 of the 3D display apparatus according to various embodiments of the present disclosure, the permeation of the external moisture may be effectively prevented. The thickness difference due to the light-emitting devices 130 may be removed by the second encapsulating layer 142. For example, a surface of the second encapsulating layer 142 opposite to the device substrate 110 may be a flat surface.

Light-blocking patterns 150 may be disposed on the encapsulating element 140. Each of the light-blocking patterns 150 may extend in one direction. The extending direction of the light-blocking patterns 150 may have a certain inclination with the first direction X. For example, each of the light-blocking patterns 150 may include a portion overlapping with the pixel regions PA. The light-blocking patterns 150 may include a light-blocking material. For example, the light-blocking patterns 150 may include black dye. Thus, in the 3D display apparatus according to various embodiments of the present disclosure, the light emitted from the pixel regions PA may be partially blocked by the light-blocking patterns 150.

A planarizing layer 160 may be disposed on the light-blocking patterns 150. The planarizing layer 160 may prevent the damage of the light-blocking patterns 150 due to the external impact. The planarizing layer 160 may include an insulating material. The planarizing layer 160 may remove the thickness difference due to the light-blocking patterns 150. For example, the planarizing layer 160 may include an organic material. A surface of the planarizing layer 160 opposite to the device substrate 100 may be a flat surface.

The light-emitting device 130 of each pixel region PA may be independently controlled with the light-emitting device 130 of adjacent pixel region PA. For example, the first electrode 131 of each light-emitting device 130 may be spaced away from the first electrode 131 of adjacent light-emitting device 130. A bank insulating layer 114 may be disposed in a space between adjacent first electrodes 131. For example, the bank insulating layer 114 may cover an edge of each first electrode 131. The light-emitting layer 132 and the second electrode 133 of each light-emitting device 130 may be stacked on a portion of the first electrode 131 of the corresponding light-emitting device 130 which is exposed by the bank insulating layer 114. The bank insulating layer 114 may include an insulating material. For example, the bank insulating layer 114 may include an organic material. The bank insulating layer 114 may be in direct contact with the over-coat layer 113 at the outside of each first electrode 131. The bank insulating layer 114 may include a material different from the over-coat layer 113.

The light-emitting device 130 of each pixel region PA may realize a color different from the light-emitting device 130 of adjacent pixel region PA. For example, the light-emitting layer 132 of each light-emitting device 130 may include a material different from the light-emitting layer 132 of adjacent light-emitting device 130. The light-emitting layer 132 of each light-emitting device 130 may be spaced away from the light-emitting layer 132 of adjacent light-emitting device 130. For example, the light-emitting layer 132 of each light-emitting device 130 may include an end portion disposed on the bank insulating layer 114.

A voltage applied to the second electrode 133 of each pixel region PA may be the same as a voltage applied to the second electrode 133 of adjacent pixel region PA. For example, the second electrode 133 of each light-emitting device 130 may be electrically connected to the second electrode 133 of adjacent light-emitting device 130. The second electrode 133 of each light-emitting device 130 may include the same material as the second electrode 133 of adjacent light-emitting device 130. The second electrode 133 of each light-emitting device 130 may be in contact with the second electrode 133 of adjacent light-emitting device 130. For example, the second electrode 133 of each light-emitting device 130 may extend onto the bank insulating layer 114.

The light-emitting device 130 of each pixel region PA may have the same structure as the light-emitting device 130 of adjacent pixel region PA. For example, each of light-emitting devices 130 may include the emitting function layer same as adjacent light-emitting device 130. The emitting function layer of each light-emitting device 130 may be coupled with the emitting function layer of adjacent light-emitting device 130. For example, in the display panel 100 of the 3D display apparatus according to various embodiments of the present disclosure, at least one of the hole injection layer (HIL), the hole transmitting layer (HTL), the electron transmitting layer (ETL) and the electron injection layer (EIL) may extend onto the bank insulating layer 114.

An optical element 200 may be disposed on the display panel 100. The optical element 200 may be disposed on a path of the light emitted from the display panel 100. For example, the optical element 200 may be disposed on the encapsulating element 140 of the display panel 100. The optical element 200 may prevent the reflection of external light due to the display panel 100. For example, the optical element 200 may have a stacked structure of a quarter-wave plate (QWP) 210 and a linear polarizer 220.

An optical adhesive layer 230 may be disposed between the quarter-wave plate 210 and the linear polarizer 220. The optical adhesive layer 230 may be in direct contact with the quarter-wave plate 210 and the linear polarizer 220. The optical adhesive layer 230 may have a refractive index between the quarter-wave plate 210 and the linear polarizer 220. For example, the refractive index of the optical adhesive layer 230 may be the same as the refractive index of the quarter-wave plate 210 or the refractive index of the linear polarizer 220. Thus, in the optical element 200 of the 3D display apparatus according to various embodiments of the present disclosure, an air-gap may be not formed between the quarter-wave plate 210 and the linear polarizer 220. That is, in the optical element 200 of the 3D display apparatus according to various embodiments of the present disclosure, the rapid change of the refractive index may be prevented between the quarter-wave plate 210 and the linear polarizer 220. Therefore, in the optical element 200 of the 3D display apparatus according to various embodiments of the present disclosure, the loss of the light due to the rapid change of the refractive index may be prevented.

A display adhesive layer 410 may be disposed between the display panel 100 and the optical element 200. The display adhesive layer 410 may be in direct contact with the display panel 100 and the optical element 200. For example, the quarter-wave plate 210 may be attached on the planarizing plate 160 by the display adhesive layer 410. The display adhesive layer 410 may have a refractive index between the planarizing plate 160 and the quarter-wave plate 210. For example, the display adhesive layer 410 may include a material different from the optical adhesive layer 230. Thus, in the 3D display apparatus according to various embodiments of the present disclosure, the loss of the light due to the rapid change of the refractive index between the display panel 100 and the optical element 200 may be prevented.

Lenticular lenses 300 may be disposed on the optical element 200. The lenticular lenses 300 may realize a 3D image in a set region using the light emitted from each light-emitting device 130 of the display panel 100. Each of the lenticular lenses 300 may extend in one direction. The extending direction of the lenticular lenses 300 may have a certain inclination with the first direction X. Each of the lenticular lenses 300 may include a portion overlapping with the pixel regions PA of the display panel 100.

A boundary of the lenticular lenses 300 may overlap with the light-blocking patterns 150. For example, the lenticular lenses 300 may extend in the same direction as the light-blocking patterns 150. A pitch of the lenticular lenses 300 may be the same as a pitch of the light-blocking patterns 150. For example, in some embodiments, a width of a lenticular lens of the lenticular lenses 300 may be the same or substantially the same as a distance between center portions of adjacent light-blocking patterns 150. Thus, in the 3D display apparatus according to various embodiments of the present disclosure, the light emitted from the light-emitting devices 130 of the display panel 100 toward the boundary of the lenticular lenses 300 may be prevented by the light-blocking patterns 150.

A lens adhesive layer 420 may be disposed between the optical element 200 and the lenticular lenses 300. The lens adhesive layer 420 may be in direct contact with the optical element 200 and the lenticular lenses 300. For example, the lenticular lenses 300 may be attached to the linear polarizer 220 by the lens adhesive layer 420. The lens adhesive layer 420 may have a refractive index between the linear polarizer 220 and the lenticular lenses 300. For example, the lens adhesive layer 420 may include a material different from the display adhesive layer 410. Thus, in the 3D display apparatus according to various embodiments of the present disclosure, the loss of the light due to the rapid change of the refractive index between the optical element 200 and the lenticular lenses 300 may be prevented.

A viewing angle control film 500 may be disposed on the lenticular lenses 300. The viewing angle control film 500 may block the light traveling toward the outside of the set region by the lenticular lenses 300. For example, the viewing angle control film 500 may include viewing angle control patterns 530 between a first transparent element 510 and a second transparent element 520.

The first transparent element 510 and the second transparent element 520 may include a transparent material. The first transparent element 510 and the second transparent element 520 may include a flexible material. For example, the first transparent element 510 and the second transparent element 520 may include plastic, such as poly-imide (PI).

The viewing angle control patterns 530 may be in direct contact with the first transparent element 510 and the second transparent element 520. The viewing angle control patterns 530 may be spaced away from each other. For example, the 3D image may be realized in the set region by the light passing between the viewing angle control patterns 530. The viewing angle control patterns 530 may include a light-blocking material. For example, the viewing angle control patterns 530 may include the same material as the light-blocking patterns 150.

Each of the viewing angle control patterns 530 may extend in one direction. For example, the viewing angle control patterns 530 may extend in a direction same as the lenticular lenses 300. Thus, in the 3D display apparatus according to various embodiments of the present disclosure, the 3D image may be realized by the light passing through the same region of each lenticular lens 300. The viewing angle control patterns 530 may overlap with the boundary of the lenticular lenses 300. For example, the viewing angle control patterns 530 may overlap the light-blocking patterns 150. A width of each viewing angle control pattern 530 may be smaller than a width of each light-blocking pattern 150. Thus, in the 3D display apparatus according to various embodiments of the present disclosure, the luminance degradation due to the light-blocking patterns 150 and the viewing angle control patterns 530 may be minimized or reduced.

The display panel 100 and the viewing angle control film 500 may be bent in one direction. For example, the display panel 100 and the viewing angle control film 500 may have a certain curvature in the second direction Y. The lenticular lenses 300 may have the same curvature as the display panel 100. A surface of the lenticular lenses 300 toward the viewing angle control film 500 may be semi-circular shape. For example, an air-gap AG overlapping with the boundary of the lenticular lenses 300 may be disposed between the lenticular lenses 300 and the viewing angle control film 500. Thus, in the 3D display apparatus according to various embodiments of the present disclosure, the diffusion of the light by the lenticular lenses 300 may be effectively performed.

The viewing angle control film 500 may be physically coupled with the display panel 100 and the lenticular lenses 300. For example, a fixing element 600 may be disposed on an edge of the display panel 100 and an edge of the viewing angle control film 500. The fixing element 600 may be in direct contact with the edge of the display panel 100 and the edge of the viewing angle control film 500. Thus, in the 3D display apparatus according to various embodiments of the present disclosure, the viewing angle control film 500 may be stably coupled with the display panel 100 and the lenticular lenses 300.

Figure 4:
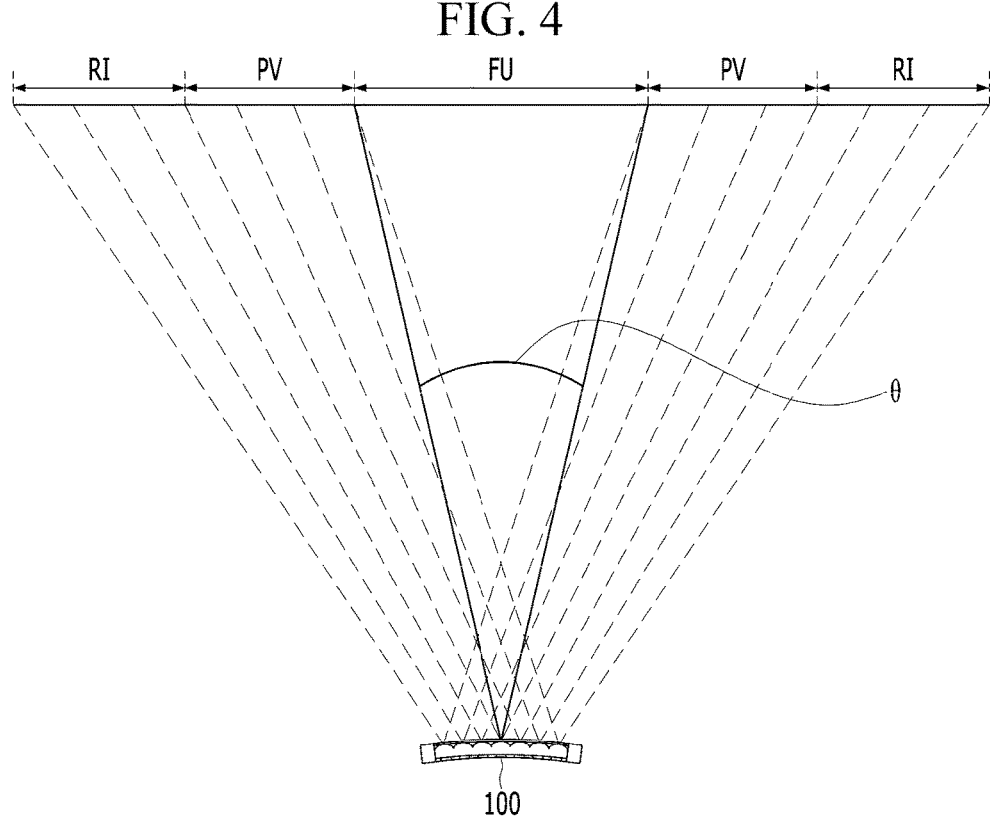
FIG. 4 is a view schematically showing a path of light in the 3D display apparatus according to various embodiments of the present disclosure.

FIG. 4 is a view schematically showing a path of light in the 3D display apparatus according to various embodiments of the present disclosure.

Referring to FIGS. 1 to 4, in the 3D display apparatus according to various embodiments of the present disclosure, the light emitted from each pixel region PA of the display panel 100 may superimpose in the set region FU by the lenticular lenses 300. The light-blocking patterns 150 of the display panel 100 and the viewing angle control film 500 may define an angle θ of the light passing through the lenticular lenses 300. For example, in the 3D display apparatus according to various embodiments of the present disclosure, the light passing through an edge of each lenticular lens 300 and traveling toward a first region PV which is disposed adjacent to the set region FU may be blocked by the light-blocking patterns 150. Thus, in the 3D display apparatus according to various embodiments of the present disclosure, the generation of a partial image due to superimposing the light passing through an edge of each lenticular lens 300 may be prevented. And, in the 3D display apparatus according to various embodiments of the present disclosure, the light traveling in the outer direction of the first region PV may be blocked by the viewing angle control film 500. Therefore, in the 3D display apparatus according to various embodiments of the present disclosure, repeated image may be not generated in a second region RI which is disposed at the outside of the first region PV.

Accordingly, the 3D display apparatus according to various embodiments of the present disclosure may include the lenticular lenses 300 and the viewing angle control film 500 which are stacked on the display panel 100, wherein the display panel 100 may include the light-blocking patterns 150 overlapping with the boundary of the lenticular lenses 300. Thus, in the 3D display apparatus according to various embodiments of the present disclosure, the partial image and the repeated image may be not generated in the outside of the set region FU. Thereby, in the 3D display apparatus according to various embodiments of the present disclosure, the quality of the 3D image provided to the user may be improved.

Figure 5:
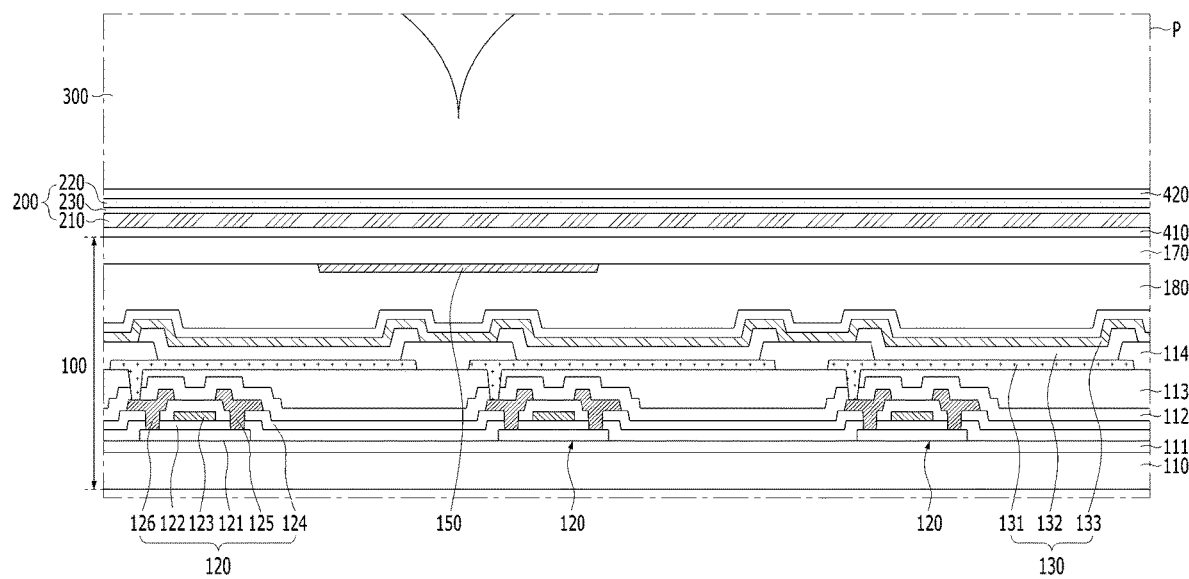
FIGS. 5-7 are views respectively showing the 3D display apparatus according to various embodiments of the present disclosure.

The 3D display apparatus according to various embodiments of the present disclosure is described that the light-blocking patterns 150 may be disposed on the encapsulating element 140. However, in the 3D display apparatus according to various embodiments of the present disclosure, the display panel 100 may be formed by coupling a device substrate 110 in which the light-emitting devices 130 are formed, and an encapsulation substrate 170 in which the light-blocking patterns 150 are formed, as shown in FIG. 5. The encapsulation substrate 170 may include a transparent material. For example, the encapsulation substrate 170 may be glass or plastic. The light-blocking patterns 150 may be in contact with the encapsulation substrate 170. An adhesive layer 180 may be disposed between the light-emitting devices 130 and the light-blocking patterns 150. The adhesive layer 180 may include an adhesive material. Thus, in the 3D display apparatus according to various embodiments of the present disclosure, the damage of the light-emitting devices 130 due to a process of forming the light-blocking patterns 150 may be prevented.

Figure 6:
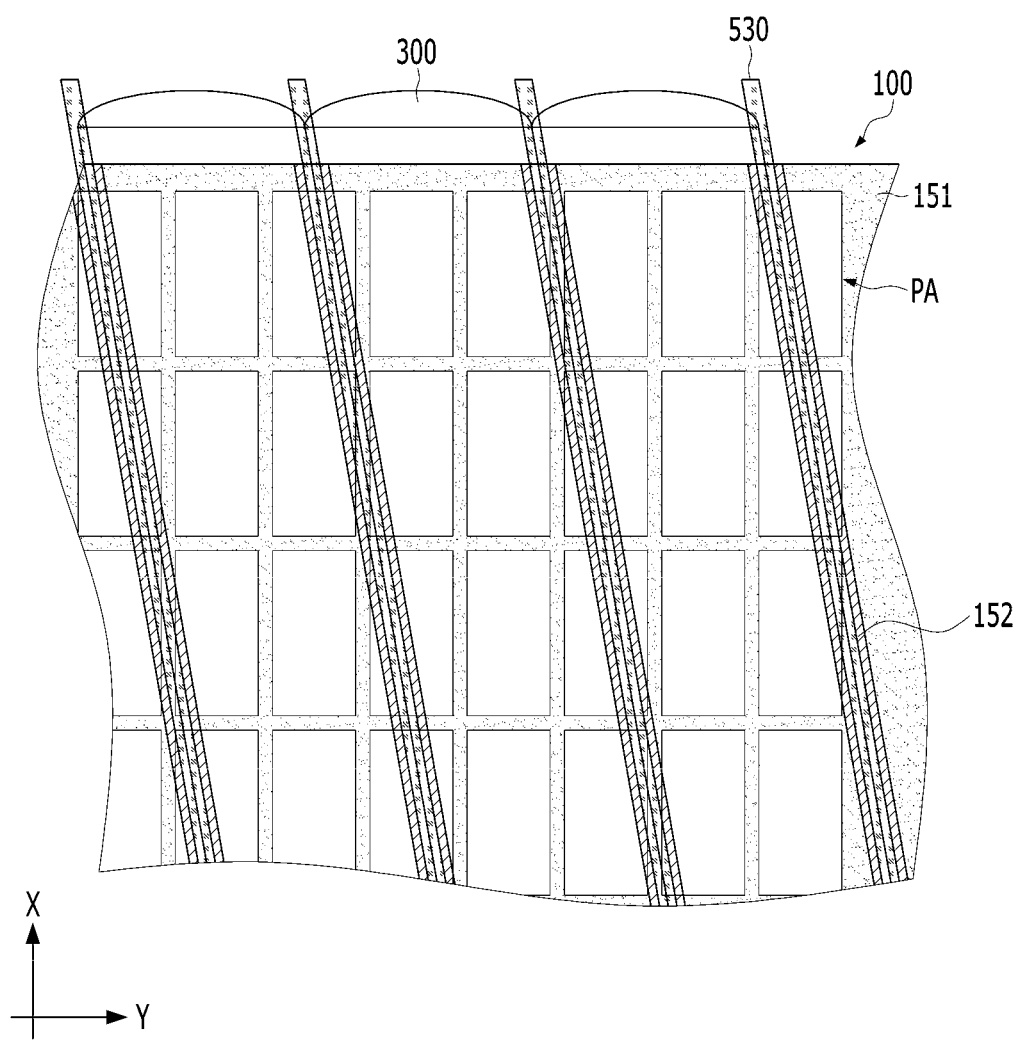
Figure 7:
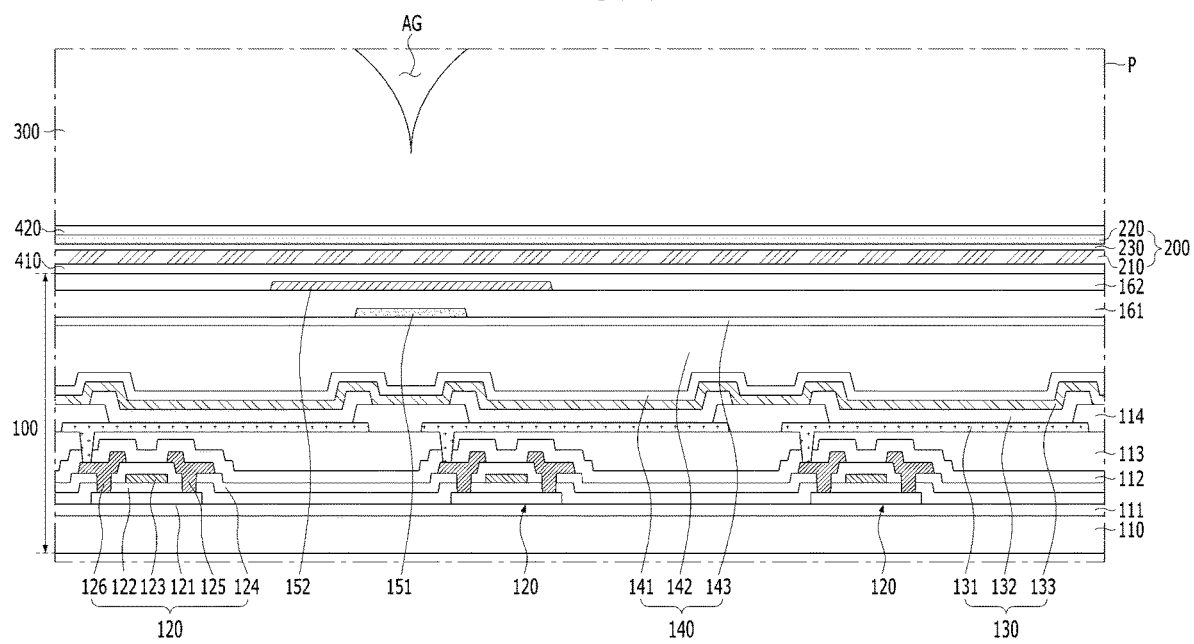

The 3D display apparatus according to various embodiments of the present disclosure may include a black matrix 151 between the pixel regions PA, as shown in FIGS. 6 and 7. For example, the black matrix 151 may overlap the bank insulating layer 114. The black matrix 151 may define the pixel regions PA. The black matrix 151 may extend in the first direction X and the second direction Y perpendicular to the first direction X. For example, the black matrix 151 may have a mesh shape. Light-blocking patterns 152 may cross a portion of the black matrix 151. The black matrix 151 may include a light-blocking material. For example, the black matrix 151 may include the same material as the light-blocking patterns 152.

A width of each light-blocking pattern 152 may be different from a width of the black matrix 151. For example, the light-blocking patterns 152 may have a width larger than the black matrix 151. The black matrix 151 may be disposed on a layer different from the light-blocking patterns 152. For example, a first planarizing layer 161 and a second planarizing layer 162 may be stacked on the encapsulating element 140 which covers the light-emitting devices 130. The black matrix 151 may be disposed between the encapsulating element 140 and the first planarizing layer 161. The thickness difference due to the black matrix 151 may be removed by the first planarizing layer 161. The light-blocking patterns 152 may be disposed between the first planarizing layer 161 and the second planarizing layer 162. The thickness difference due to the light-blocking patterns 152 may be removed by the second planarizing layer 162. The optical element 200 may be attached to the second planarizing layer 162. Thus, in the display panel 100 of the 3D display apparatus according to various embodiments of the present disclosure, the degree of freedom for a process of forming the light-blocking patterns 152 may be improved.

In the result, the 3D display apparatus according to various embodiments of the present disclosure may comprise the lenticular lenses between the display panel and the viewing angle control film, wherein the display panel includes the light-blocking patterns overlapping with the boundary of the lenticular lenses. Thus, in the 3D display apparatus according to various embodiments of the present disclosure, the light emitted from the display panel toward the boundary of the lenticular lenses may be blocked. Thereby, in the 3D display apparatus according to various embodiments of the present disclosure, the generation of the partial image and the repeated image at the outside of the set region may be effectively prevented.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A 3D display apparatus, comprising:
a display panel including pixel regions, a black matrix between the pixel regions, and light-blocking patterns disposed on a layer different from the black matrix, the pixel regions being disposed side by side in a first direction and a second direction that is perpendicular to the first direction;
lenticular lenses on the display panel, the lenticular lenses extending in an inclined direction that is inclined with respect to the first direction; and
a viewing angle control film on the lenticular lenses,
wherein each of the light-blocking patterns overlaps with a boundary between adjacent lenticular lenses of the lenticular lenses, and extends in the same direction as the lenticular lenses.

2. The 3D display apparatus according to claim 1, wherein each of the lenticular lenses and each of the light-blocking patterns includes a region overlapping with at least a portion of the pixel regions.

3. The 3D display apparatus according to claim 1, further comprising a lens adhesive layer between the display panel and the lenticular lenses.

4. The 3D display apparatus according to claim 3, further comprising an optical element between the display panel and the lens adhesive layer,
wherein the lens adhesive layer is in contact with the optical element and the lenticular lenses.

5. The 3D display apparatus according to claim 1, wherein the viewing angle control film includes a first transparent element, a second transparent element, and viewing angle control patterns between the first and second transparent elements, each of the viewing angle control patterns extending in a same direction as the lenticular lenses.

6. The 3D display apparatus according to claim 5, wherein the viewing angle control patterns overlap with the light-blocking patterns.

7. The 3D display apparatus according to claim 1, further comprising an air-gap between the lenticular lenses and the viewing angle control film, the air-gap overlapping with the light-blocking patterns.

8. The 3D display apparatus according to claim 7, further comprising a fixing element being in contact with an edge of the display panel and an edge of the viewing angle control film.

9. The 3D display apparatus according to claim 6, wherein a width of each viewing angle control pattern is smaller than a width of each light-blocking pattern.

10. The 3D display apparatus according to claim 1, wherein the black matrix includes the same material as the light-blocking patterns.

11. The 3D display apparatus according to claim 4, further comprising a display adhesive layer between the display panel and the optical element, wherein the display adhesive layer is in contact with the display panel and the optical element, and wherein the display adhesive layer includes a material different from the optical adhesive layer.

12. The 3D display apparatus according to claim 1, further comprising a planarizing layer between the black matrix and the light-blocking patterns.

13. The 3D display apparatus according to claim 1, wherein the display panel and the viewing angle control film have a certain curvature in the second direction.

* * * * *